United States Patent [19]

Cameron

[11] 4,111,226

[45] Sep. 5, 1978

[54] MULTIPLE FUNCTION FOUR POPPET VALVE SYSTEM

[75] Inventor: Russell J. Cameron, Rochester, Mich.

[73] Assignee: Ross Operating Valve Co., Detroit, Mich.

[21] Appl. No.: 820,617

[22] Filed: Aug. 1, 1977

[51] Int. Cl.$^2$ ........................ F15B 13/00; F16K 11/20

[52] U.S. Cl. ................................ 137/269; 137/596.15; 137/596.18

[58] Field of Search .................... 137/269, 271, 596.15, 137/596.14, 596.18

[56] References Cited

U.S. PATENT DOCUMENTS

| | | | |
|---|---|---|---|
| 2,218,861 | 10/1940 | Stumpf | 137/596.15 UX |
| 2,861,550 | 11/1958 | Hanna | 137/596.15 |
| 2,891,518 | 6/1959 | Krapf | 137/596.18 |
| 3,561,468 | 2/1971 | Sugden | 137/269 |

*Primary Examiner*—Alan Cohan

*Attorney, Agent, or Firm*—Harness, Dickey & Pierce

[57] ABSTRACT

Four poppet valves are mounted in a common machined body which has a single inlet port, a pair of working ports and a pair of exhaust ports. The body interior has four valve ports, two of which connect the inlet port to the two working ports and the other two connecting the working ports with the exhaust ports. The housing also has identically sized guide supports and piston chambers for the poppet valves. These may be chosen either as normally closed or normally open straight way valves in a variety of arrangements. With each arrangement one or more pilot valves, either straight way, three-way or four-way, normally closed or normally open, may be connected to the piston chambers. Thus, the valve system may be arranged to have a four-way function as controlled by a single normally closed three-way pilot valve, operate two independent fluid motors using two three-way pilots, or can be arranged for various other control functions.

7 Claims, 5 Drawing Figures

MULTIPLE FUNCTION FOUR POPPET VALVE SYSTEM

BACKGROUND OF THE INVENTION

1. Field of the Invention

The invention relates to control valves for fluid motors or the like, and more particularly to control valve systems which may be arranged in various ways to perform different functions, as a result of the varied choice of pilot valves and main valve parts. The invention is particularly pertinent to systems using poppet valves rather than spool valves, such systems being especially useful in industrial environments such as foundries where the dust laden atmosphere could cause spool valves to become clogged.

2. Description of the Prior Art

Generally speaking, it has been necessary in the past to design a particular poppet valve system to accomplish a given function, and this system is thereafter incapable of being easily converted to another use. For example, if a specific arrangement of pilot operated main poppet valves is designed to achieve a two position four-way function in the control of opposite ends of a reciprocable fluid motor, it is difficult if not impossible to change such a construction to achieve another function, such as the independent or sequential operation of two, three or four separate fluid motors.

An example of a four-way poppet valve in the prior art which is constructed to achieve a specific function is shown in Stumpf U.S. Pat. No. 2,218,861. This patent, however, has drawbacks as compared with the present invention which will hereinafter appear.

BRIEF SUMMARY OF THE INVENTION

It is an object of the present invention to provide a novel and improved poppet valve system which is capable of achieving straight way, three-way or four-way functions of various sorts and may be converted quite easily and economically from one function to another, using a minimum of parts and with these parts being standardized.

It is another object to provide a system of this nature which utilizes only a single machined body, this body being capable of adaptation without further modification to any of the functions to which the system may be converted.

It is a further object to provide an improved poppet valve system of this type which offers flexibility in the modulation of its functions, such as by the use of metering washers or shrouding stems and with various types of pilot valves.

Briefly, the invention comprises, in combination, a valve body having an inlet port, a pair of working ports, and a pair of exhaust ports, an inlet chamber in said body connected to said inlet port, a pair of working chambers connected to said working ports respectively, and a pair of exhaust ports connected to said exhaust ports respectively, four main valve piston chambers formed in said body, four valve ports formed in said body and aligned with said piston chambers, two of said ports being disposed between said inlet chamber and said working chambers respectively and two ports between said working chambers and said exhaust chambers respectively, each port having valve seats on its opposite sides, a plurality of poppet valves of two types, one type being normally closed and the other normally open, each of said normally open valves comprising a piston and a valve portion engageable with the downstream seat of a valve port, each of said normally closed valves comprising a piston and a valve portion engageable with the upstream seat of a valve port, seals carried by said body adjacent said piston chambers, said valves having portions engageable with said seals, said seal engaging portions and said piston portions on both the normally closed and normally open valves having a common diameter whereby the normally closed or normally open valves may be interchangeably mounted in any of the piston chambers to engage the corresponding valve port seats, springs in said body engageable with said valves to urge them toward deactivated positions, separate pilot valve ports connected with said four piston chambers, and at least one pilot valve controlling said pilot valve ports.

DESCRIPTION OF THE PREFERRED EMBODIMENTS

Figure 1:
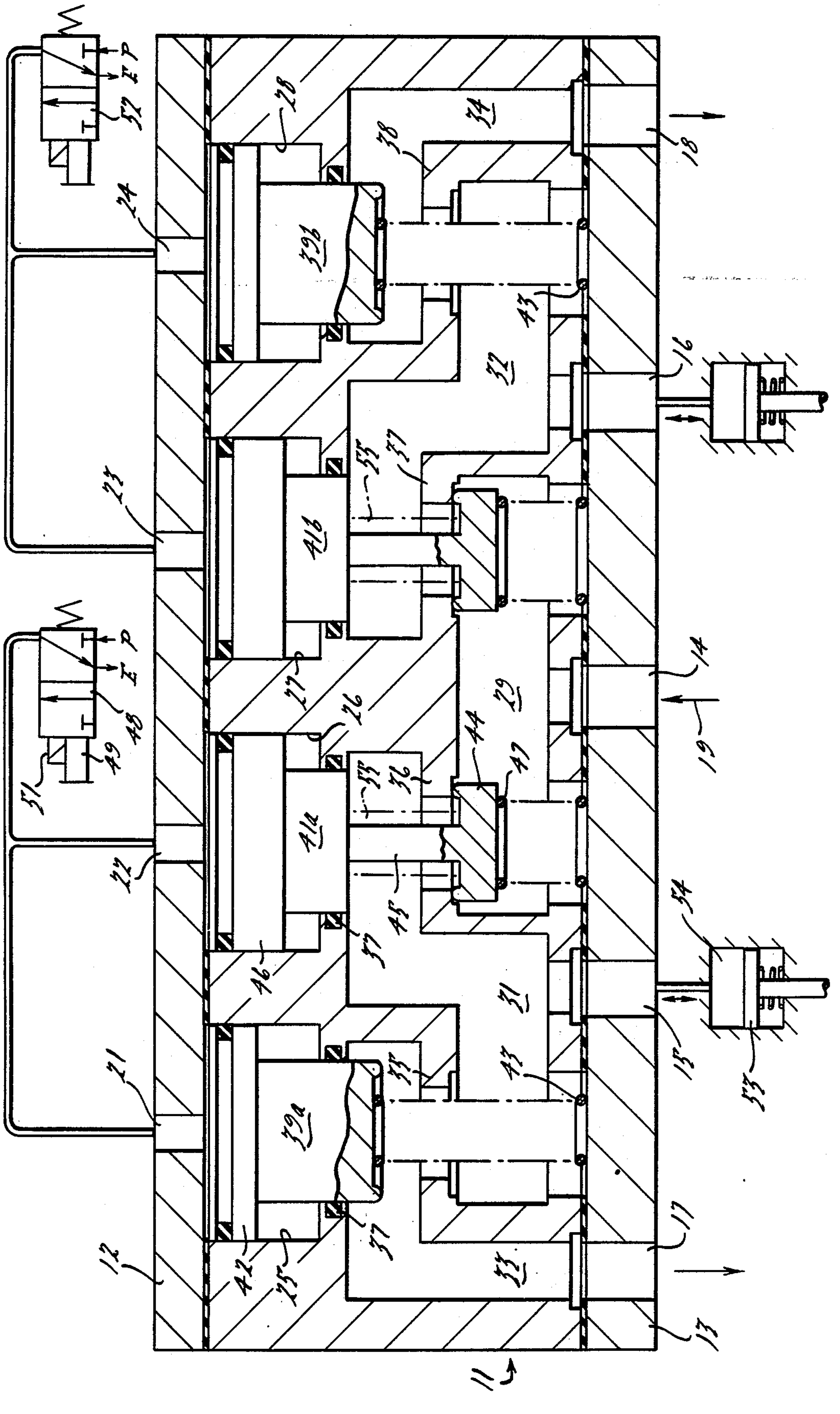
FIG. 1 is a partially schematic cross-sectional view showing two normally closed and two normally open main poppet valves controlled by two three-way normally closed pilot valves to achieve the function of two independent three-way normally closed main valves.

FIG. 1 shows a first embodiment of the invention having a body generally indicated at 11 with covers 12 and 13 on opposite sides thereof. One side of body 11 is provided with a pressure inlet port 14, a pair of working ports 15 and 16 on opposite sides of port 14, and a pair of exhaust ports 17 and 18 outside ports 15 and 16. Port 14 is adapted to be connected to a source 19 of fluid pressure. The other side of body 11 is provided with four pilot ports 21, 22, 23 and 24.

Four main valve piston chambers 25, 26, 27 and 28 are formed in body 11 and connected to ports 21 through 24 respectively.

A central inlet chamber 29 is formed in body 11 and connected to inlet port 14. A pair of working chambers 31 and 32 are formed on either side of chamber 29 and connected to ports 15 and 16 respectively. A pair of exhaust chambers 33 and 34 are formed outwardly of chambers 31 and 32 respectively and are connected to exhaust ports 17 and 18.

A double sided valve port 35 is formed between chambers 31 and 33, having one seat facing port 33 and the other facing chamber 31. This seat is aligned with chamber 25, a seal 37 of being formed between chambers 25 and 33. Similarly, double sided valve ports 36, 37 and 38 are formed in line with chambers 26, 27 and 28 respectively. Port 36 is disposed between chambers 29 and 31, port 37 between chambers 29 and 32 and port 38 between chambers 32 and 34.

Two types of poppet valves are used in FIG. 1, a normally open valve 39 and a normally closed valve 41. Valve 39 has a valve portion slidable in seal 37 and engageable with the downstream seat or port 35, and a piston portion 42 in the piston chamber. Two valves 39*a* and 39*b* are shown in chambers 25 and 28 respectively. These valves are urged to their open position by helical coil compression springs 43 engageable at one end with cover 13 and at the other end with the valve, passing through the valve port. When the piston chamber of a valve 39 is depressurized the valve will be opened, connecting the working chamber 31 or 32 to the corresponding exhaust chamber. When the piston chamber is pressurized the valve will be closed.

Each valve 41 comprises a valve portion 44 engageable with the upstream side of a valve port 36 or 37 and connected by a stem 45 to a guide portion slidable in seal 37. Although the normally closed valves are schematically shown they will be so constructed as to be installable in the body. A piston portion 46 surmounts guide portion 41. Two such valves 41*a* and 41*b* are disposed in piston chambers 26 and 27 respectively. When the piston chamber of a valve 41 is depressurized the valve will be in the closed position, closing the connection between pressure chamber 29 and the respective working chamber 31 or 32. A spring 47 urges each valve 41 to its closed position and pressurization of the piston chamber will shift the valve to its open position against the action of the spring.

Valves 39*a* and 41*a* may be controlled by a three-way normally closed pilot valve 48. The working port of this pilot valve is connected to pilot ports 21 and 22. The pilot valve is spring urged to an exhaust position as shown in FIG. 1 in which ports 21 and 22 are connected to exhaust and may be shifted either by a hand actuated member 49, an electrically actuated member 51, or both, to an open position in which ports 21 and 22 are pressurized. A similar three-way normally open pilot valve 52 is provided for ports 23 and 24.

Each working port 15 and 16 may be connected to a single acting fluid motor 53 which is spring urged to one position and pressure urged to the opposite position. Each of these two motors may thus be controlled independently by its respective pilot valve 48 or 52.

In operation of the embodiment of FIG. 1, when both pilot Valves 48 and 52 are de-energized fluid motors. 53 will be in their raised positions. To operate both fluid motors to their shifted positions, both valves 48 and 52 will be energized. This will open valves 41*a* and 41*b* and close valves 39*a* and 39*b*, pressurizing the piston chambers 54 of motors 53. De-energization of both valves 48 and 52 will cause the parts to move back to their raised positions.

Instead of the pilot valves shown, the main valve assembly could be controlled by another pilot valve arrangement. For example, two three-way normally open pilots could be used in which case the action described above would be reversed. That is, with the pilot valves de-energized the fluid motors would be shifted to their pressurized positions. Of course, with either of these pilot valve arrangements, the two pilot valves could be independently operated rather than operated in unison. Another possible arrangement would be to have four separate three-way normally open pilot valves controlling the four pilot ports 21 throught 24. Still another possibility would be to use the unit as double acting parallel three-way safety valves, with the outlet ports 15 and 16 being connected to a single reciprocable fluid motor used to operate a press brake and clutch.

U.S. Pat. No. 2,906,246 shows double acting parallel three-way valves used for safety purposes in connection with the control of a pneumatically actuated clutch and brake for a press or similar machine, so that in case of failure of one of the valves the danger of injury to the operator or damage to the machine will be minimized. The present invention could be adapted for a similar purpose. In this case, valves 39*a* and 41*a* would constitute one of the parallel double valves and valves 39*b* and 41*b* would constitute the other valve. With such an arrangement shrouds shown in dot-dash lines at 55 would be placed on stems 45 of valves 41*a* and 41*b* in order to insure that a supply valve stuck in its open position will not supply fluid at as fast a rate as it can be exhausted.

Figure 2:
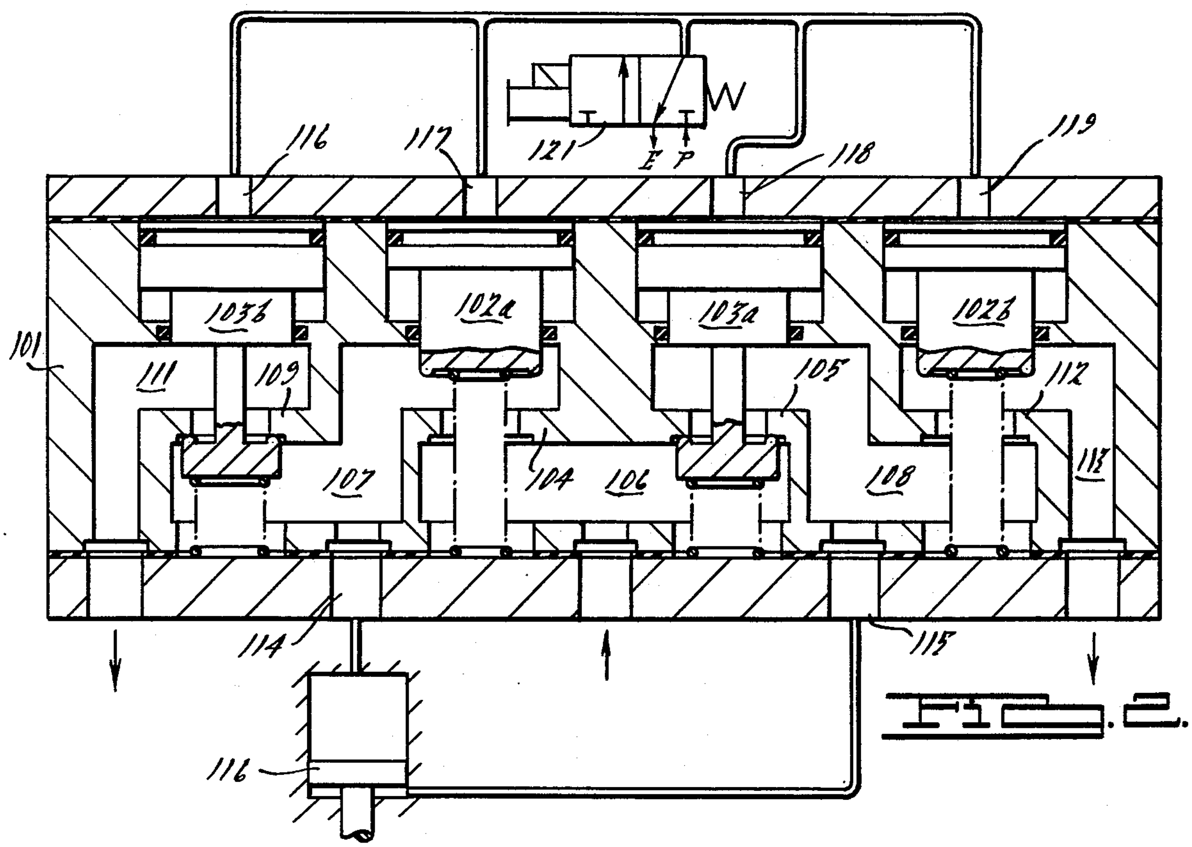
FIG. 2 is a cross-sectional view of another arrangement showing two normally closed and two normally open poppet valves controlled by a single normally closed three-way pilot valve to achieve the function of a standard four-way poppet valve.

FIG. 2 shows another arrangement having a body 101 but in this case a normally open poppet valve 102*a* and a normally closed poppet valve 103*a* controlling the two ports 104 and 105 respectively between pressure chamber 106 and the two working chambers 107 and 108. A second normally closed valve 103*b* controls the port 109 between chambers 107 and adjacent exhaust chamber 111, and a normally open valve 102*b* controls the port 112 between chamber 108 and exhaust chamber 113. Body 101 is constructed exactly like body 11, it being noted that the normally open and normally closed main valves may also be of standard construction such as those shown in FIG. 1 but simply placed in different positions within the body. In this case the working ports 114 and 115 of body 101 control opposite sides of a double acting fluid motor 116. The pilot ports 116 through 119 are controlled by a single normally closed three-way pilot valve 121.

In operation of the embodiment of FIG. 2, when valve 121 is in its de-energized position as shown in that figure, motor 116 will be in its lower position in view of the fact that port 114 is pressurized and port 115 exhausted. When valve 121 is energized all valves 102*a*, 102*b*, 103*a* and 103*b* will be reversed and motor 116 will be lifted. Thus, the valve assembly acts as a standard four-way poppet valve controlling a double acting fluid motor. It should be noted that the positions of the normally open and normally closed valves in FIG. 2 could be reversed; this would have the effect of reversing the action of fluid motor 116.

Figure 3:
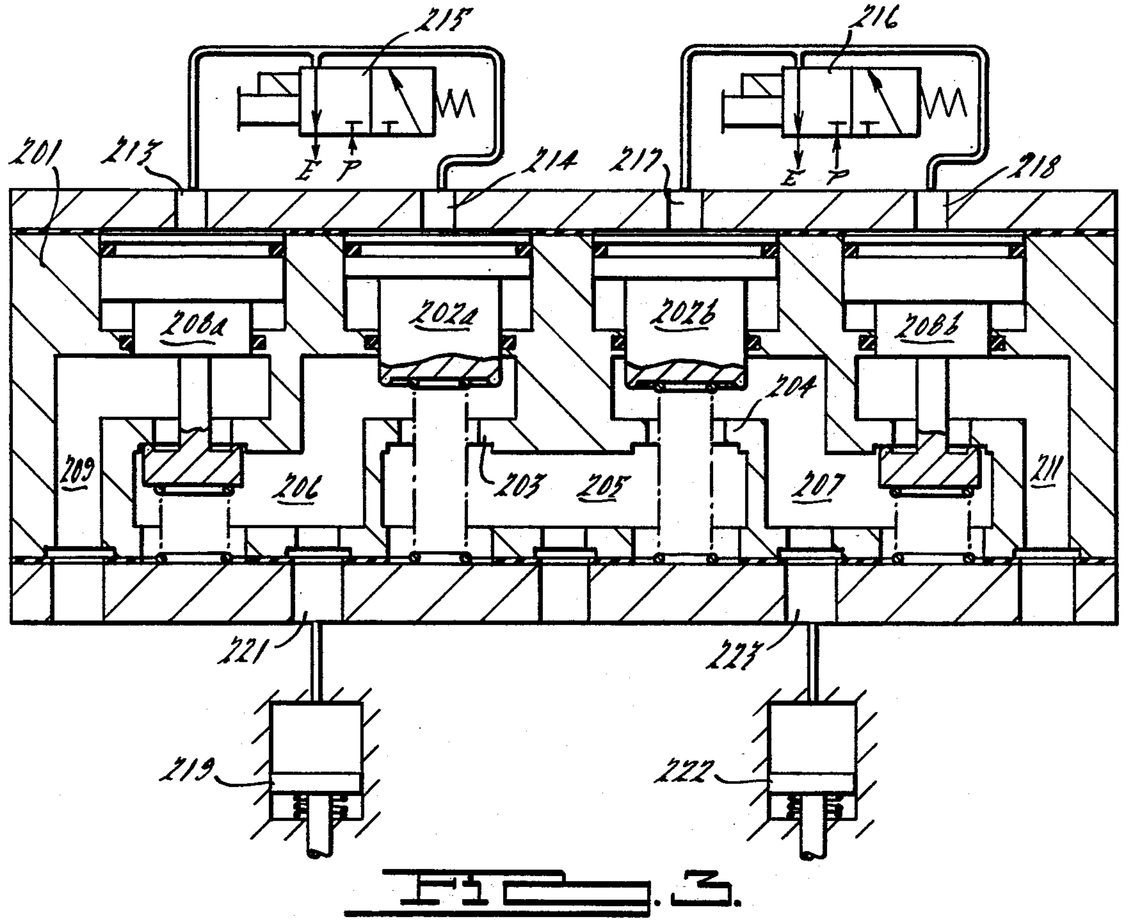
FIG. 3 is a cross-sectional view showing the construction as arranged with two normally closed and two normally open main poppet valves controlled by two three-way normally open pilot valves to achieve the function of two normally open three-way independent main valves.

FIG. 3 shows still another arrangement in which body 201 is provided with two normally open valves 202*a* and 202*b* controlling ports 203 and 204 which connect inlet chamber 205 with working chambers 206 and 207 respectively. Normally closed valves 208*a* and 208*b* are provided between chambers 206 and 207 and the respective exhaust chambers 209 and 211. The two pilot valve ports 213 and 214 for valves 208*a* and 202*a* respectively are controlled by a three-way normally open pilot valve 215 which is shown in FIG. 3 in its energized or closed position. A similar pilot valve 216 is provided for controlling pilot ports 217 and 218 for valves 202*b* and 208*b* respectively. A single acting fluid motor 219 is controlled by working port 221 and a similar motor 222 by working port 223.

In operation of the embodiment of FIG. 3, when valves 215 and 216 are de-energized, all four valves 208*a*, 202*a*, 202*b* and 208*b* will be pressurized. Thus, both fluid motors 219 and 222 will be depressurized and in their upper positions. When, as shown, both pilot valves 215 and 216 are energized, the main valves will be shifted and the fluid motors shifted to their lower positions. As indicated above with respect to FIG. 1, valves 215 and 216 could be independently controlled.

Figure 4:
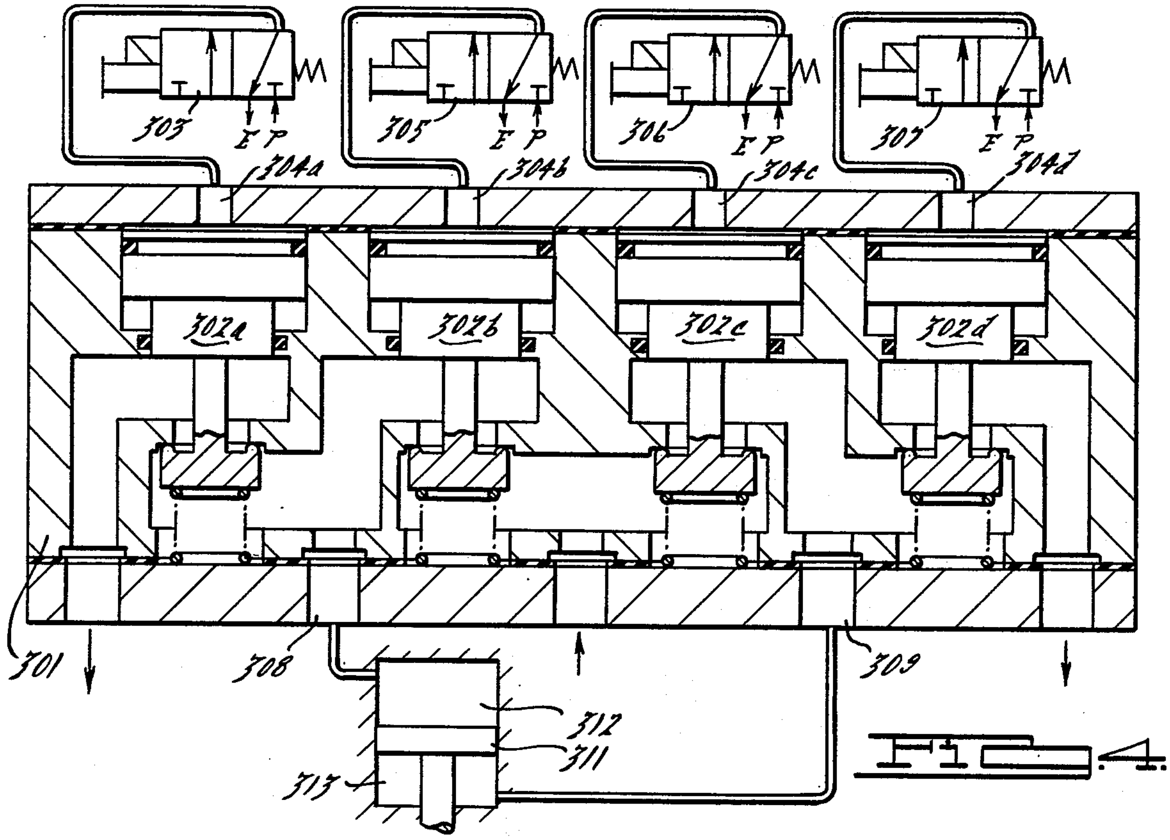
FIG. 4 shows the unit using four normally closed main poppet valves controlled by four separate normally closed three-way pilot valves to achieve the equivalent of a closed center crossover valve with both working ports controlled in the neutral position.

FIG. 4 shows an arrangement 301 in which all four valves 302*a*, 302*b*, 302*c* and 302*d* are normally closed main valves. Each individual pilot port 304*a*, 304*b*, 304*c* and 304*d* is controlled by a separate valve 303, 305, 306 and 307. Working ports 308 and 309 are connected to opposite sides of a double acting fluid motor 311.

In operation of embodiment of FIG. 4, fluid motor 311 will be controlled similarly to fluid motor 116 in FIG. 2, except for the fact that the presence of four individual three-way normally closed pilot valves enhances the flexibility of operation. More particularly, the four pilot valves could be energized or de-energized in such a fashion that both valves 302*b* and 302*c* are open and both of valves 302*a* and 302*d* are closed. This would create a neutral condition in which both sides of chambers 312 and 313 of fluid motor 311 are pressurized. Similarly, the arrangement could be such that both chambers 312 and 313 are exhausted by virtue of valves 302*a* and 302*d* being open and valves 302*b* and 302*c* closed. Thus, one would have the equivalent of a pilot operated four-way three position control valve which in its neutral position connects both sides of a fluid motor to exhaust or to pressure. If all four valves 302*a*, 302*b*, 302*c* and 302*d* are closed at the same time the neutral position of the valve assembly would be such that both sides of the fluid motor are closed.

One of the uses of such an arrangement is to achieve the equivalent, with poppet valves, of a closed center crossover spool valve. Almost all conventional four-way poppet valves have open crossovers in which the supply of fluid could leak during actuation resulting in a significant and costly fluid loss over a time period. The above-described arrangement could be used to obviate this disadvantage in four-way poppet valves.

Figure 5:
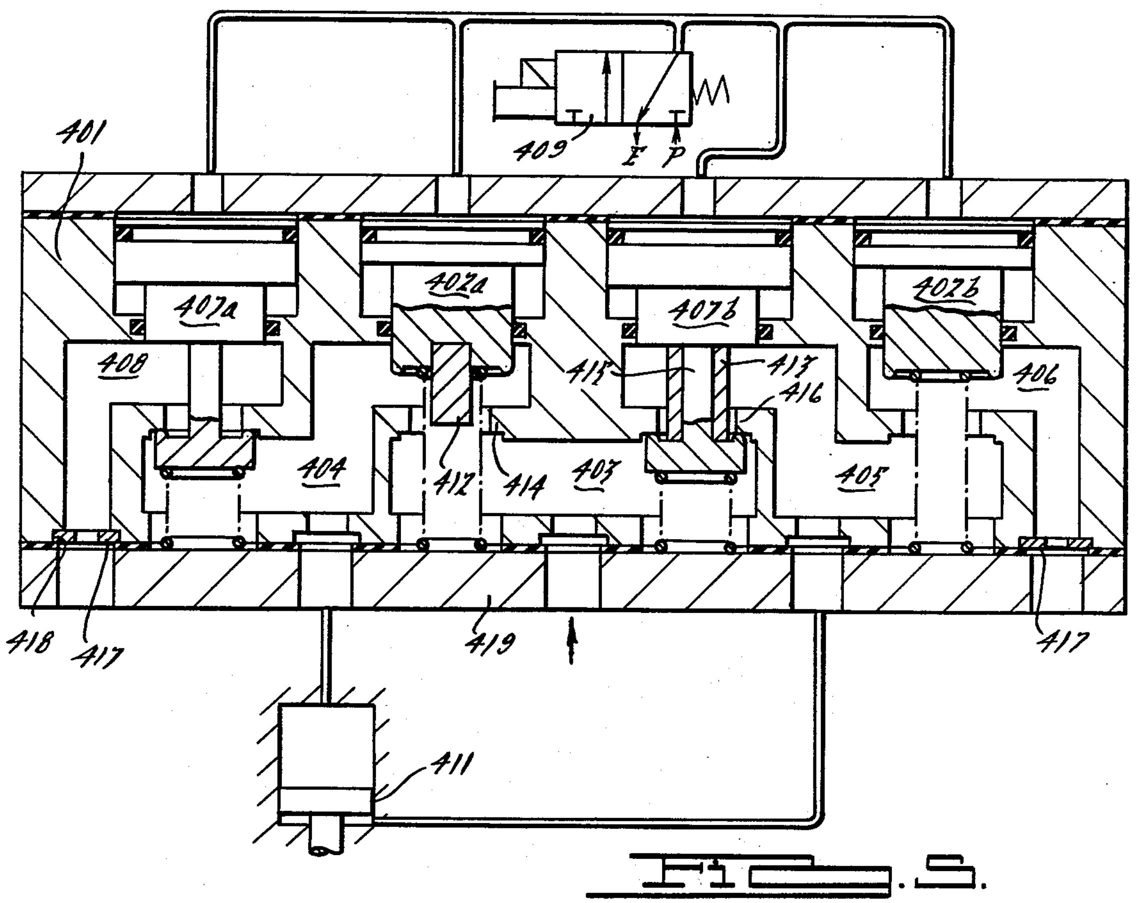
FIG. 5 is a view similar to FIG. 2, that is, an arrangement achieving the function of a four-way valve, but showing the addition of metering washers and shrouds.

FIG. 5 shows still another embodiment of the invention indicated at 401 which is similar to FIG. 2 but shows the use of metering washers and shrouds to control the rate of fluid flow in the various valves. The two normally open valves 402*a* and 402*b* are arranged so that valve 402*a* is disposed between inlet chamber 403 and working chamber 404 whereas valve 402*b* is placed between working chamber 405 and exhaust chamber 406. Normally closed valve 407*a* is between chamber 404 and exhaust chamber 408 whereas normally closed valve 407*b* is placed between chambers 403 and 405. A three-way normally closed pilot valve 409 controls all four pilot ports and a double acting fluid motor 411 is controlled by the working ports.

To control the rate of fluid inflow, a shroud 412 is carried by normally open valve 402*a* and a shroud 413 by normally closed valve 407*b*. Shroud 412 is in the form of a plug or extension secured to the central portion of valve 402*a* and extending through its port 414 to restrict the flow therethrough. Shroud 413 is in the form of a sleeve surrounding stem 415 and therefore restricting the flow through port 416. Metering washers 417 are disposed in recesses 418 formed in body 401 adjacent cover 19. It will thus be seen that the shrouds and metering washers could easily be utilized with the valve construction of this invention without detracting from the uniform construction of the valve and valve body described above.

The above-described embodiments are intended to be merely illustrative of the possible combinations and arrangements of this invention which afford flexibility in accomplishing many possible combinations and functions.

While it will be apparent that the invention herein disclosed is well calculated to achieve the benefits and advantages as hereinabove set forth, it will be appreciated that the invention is susceptible to modification, variation and change without departing from the spirit thereof.

I claim:

1. In combination, a valve body having an inlet port, a pair of working ports, and a pair of exhaust ports, an inlet chamber in said body connected to said inlet port, a pair of working chambers connected to said working ports respectively, and a pair of exhaust ports connected to said exhaust ports respectively, four main valve piston chambers formed in said body, four valve ports formed in said body and aligned with said piston chambers, two of said ports being disposed between said inlet chamber and said working chambers respectively and two ports between said working chambers and said exhaust chambers respectively, each port having valve seats on its opposite sides, a plurality of poppet valves of two types, one type being normally closed and the other normally open, each of said normally open valves comprising a piston and a valve portion engageable with the downstream seat of a valve port, each of said normally closed valves comprising a piston and a valve portion engageable with the upstream seat of a valve port, seals carried by said body adjacent said piston chambers, said valves having portions engageable with said seals, said seal engaging portions and said piston portions on both the normally closed and normally open valves having a common diameter whereby the normally closed or normally open valves may be interchangeably mounted in any of the piston chambers to engage the corresponding valve port seats, springs in said body engageable with said valves to urge them toward deactivated positions, separate pilot valve ports connected with said four piston chambers, and at least one pilot valve controlling said pilot valve ports.

2. The combination according to claim 1, the two valves between said inlet chamber and working chambers being normally closed valves, said two valves between said working chambers and exhaust chambers being normally open valves.

3. The combination according to claim 1, one of said working chambers being provided with a normally open valve leading from said inlet chamber and a normally closed valve leading to the corresponding exhaust chamber, the other working chamber having a normally closed valve leading from the inlet chamber and a normally open valve leading to the corresponding exhaust chamber.

4. The combination according to claim 3, further provided with a shrouding stem on said normally open valve connecting said first working chamber to said inlet chamber, said shrouding stem comprising an extension on said valve passing through the corresponding valve port.

5. The combination according to claim 3, further provided with a shrouding stem on the normally closed valve connecting the second working chamber with said inlet chamber, said shrouding stem comprising a sleeve on the stem of said normally closed valve passing through the said corresponding valve port.

6. The combination according to claim 1, the two valves disposed between said inlet chamber and said working chambers being normally open valves, the two valves between said working and exhaust chambers being normally closed valves.

7. The combination according to claim 1, said main valves all being normally closed valves.

* * * * *

UNITED STATES PATENT AND TRADEMARK OFFICE

CERTIFICATE OF CORRECTION

PATENT NO. : 4,111,226

DATED : September 5, 1978

INVENTOR(S) : Russell J. Cameron

It is certified that error appears in the above-identified patent and that said Letters Patent are hereby corrected as shown below:

In the claims, claim 1, line 5 (column 6, line 20), change "exhaust ports" to --exhaust chambers--

Signed and Sealed this

***Twenty-fourth* Day of *July 1979***

[SEAL]

*Attest:*

LUTRELLE F. PARKER

*Attesting Officer* *Acting Commissioner of Patents and Trademarks*